Patented July 19, 1938

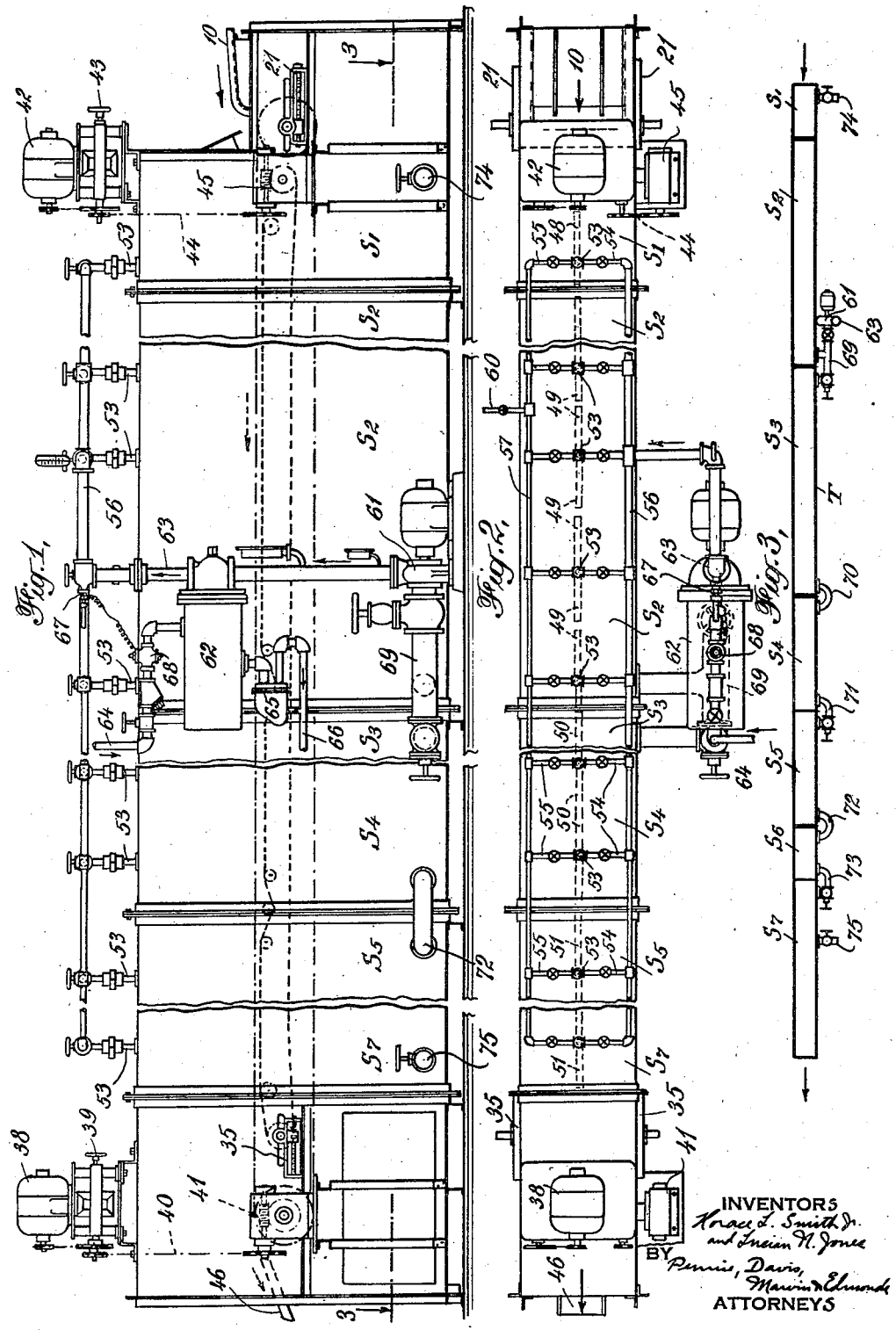

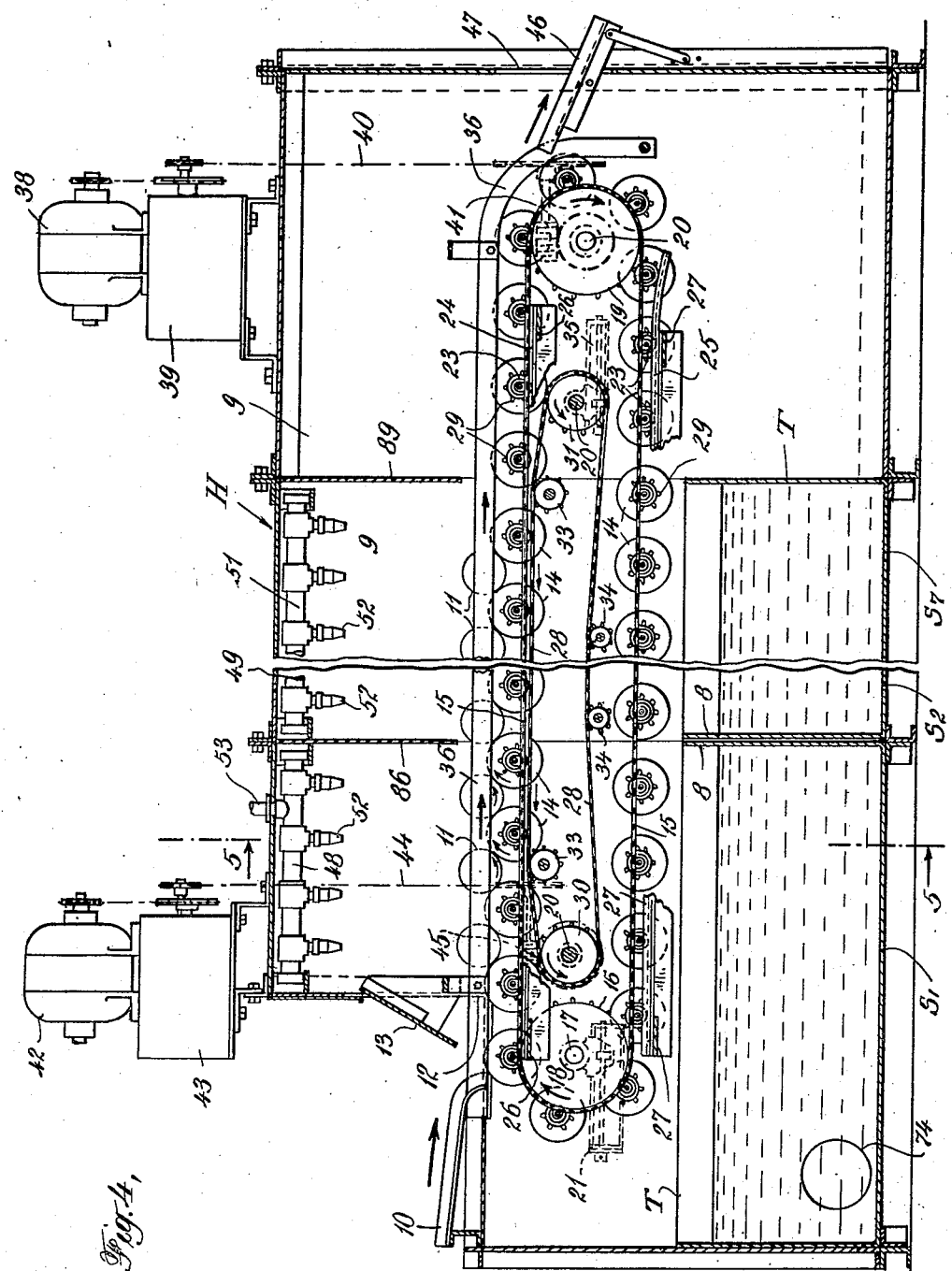

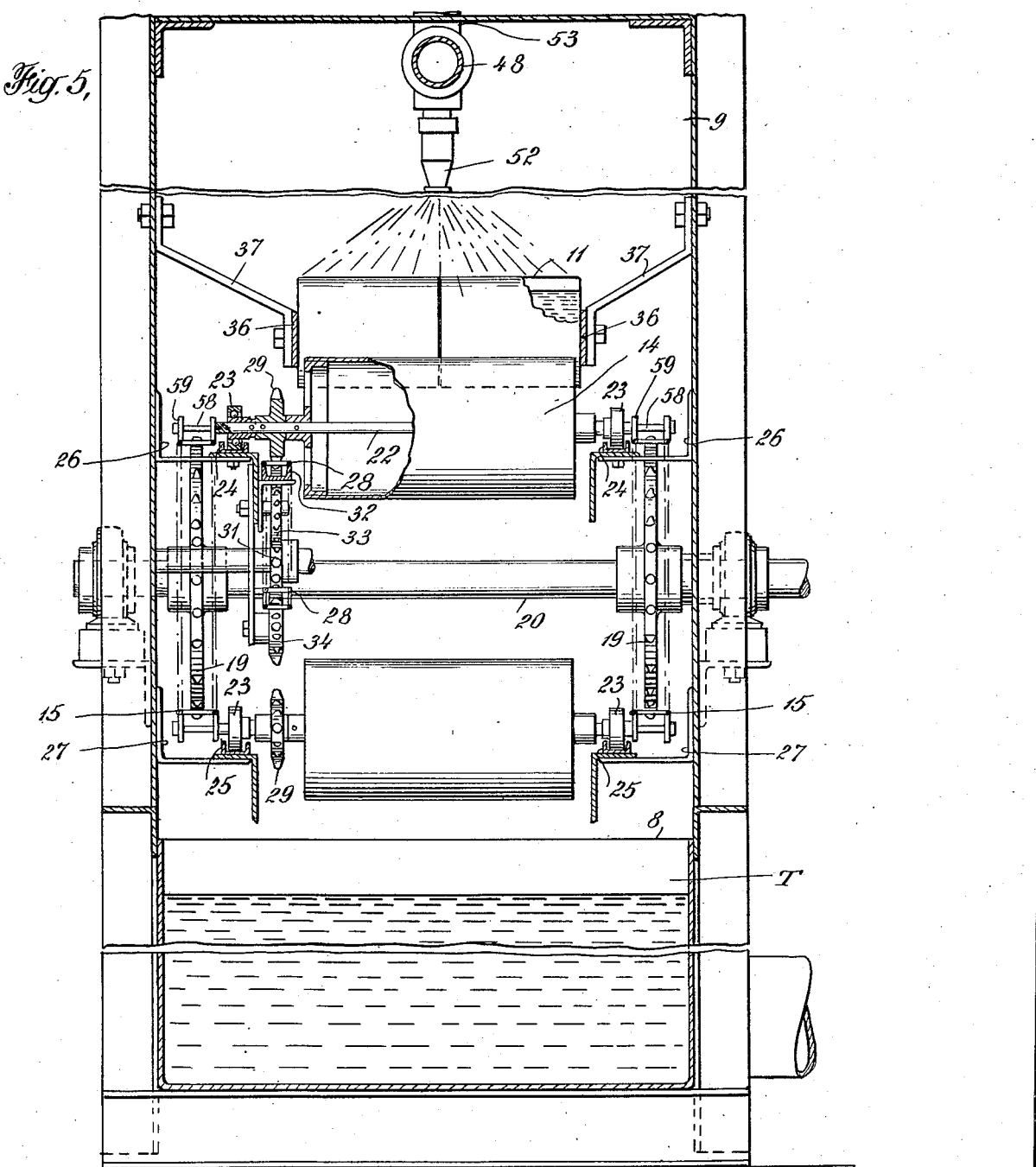

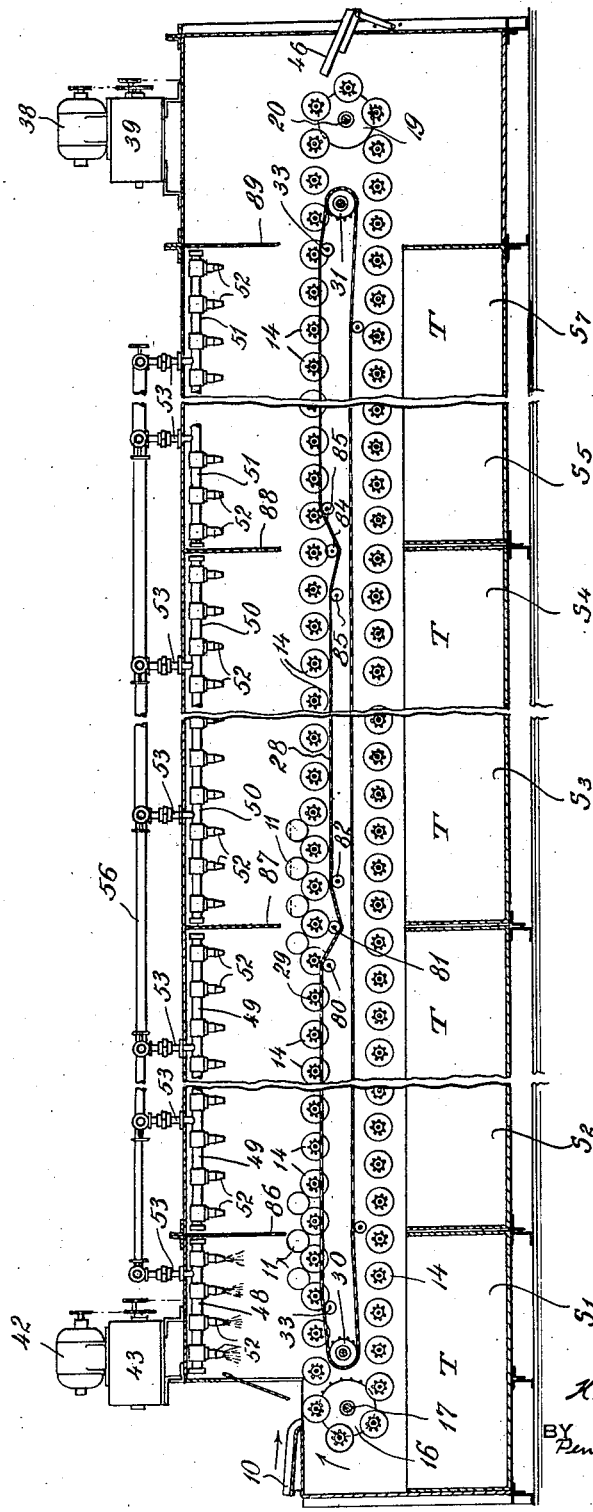

2,124,010

UNITED STATES PATENT OFFICE 2,124,010

APPARATUS FOR TREATING CANNED MATERIALS

Horace L. Smith, Jr., and Lucian N. Jones, Richmond, Va., assignors to Thermal Engineering Corporation, Richmond, Va., a corporation of Virginia Application April 25, 1936, Serial No. 76,298

5 Claims. (Cl. 53—20)

This invention relates to the treating of canned materials and more particularly concerns an improved apparatus for preserving perishable foods, beverages or other materials by heat treatment.

In canning perishable materials such as fruits, vegetables, juices or beverages, it is essential in order to prevent spoilage that fermentation promoting growths and organisms be killed or permanently inhibited during the canning operation. This is best accomplished by subjecting the materials to high temperatures, and since bacteria or other infection frequently sets in when the materials are exposed to air, it is desirable to perform the sterilizing or heat treatment operation after the material has been enclosed in a can or other container. The temperature necessary to obtain satisfactory preservation varies with different materials, but in substantially all cases, the heating of the material to the required temperature by previously known processes destroys the natural or original flavor, color and consistency of the canned material to an undesirable degree. Thus, for example, in canning citrus fruits, such as the extracted meat of grape fruit, a temperature of approximately 165° F. is required to kill the wild yeast and so prevent subsequent fermentation. With known canning processes, it requires upwards of half an hour to heat the canned fruit to this temperature, and substantially the same length of time to cool the fruit to within approximately 30° F. of room temperature. This prolonged treatment at elevated temperatures not only partially destroys the fresh fruit flavor and color, but undesirably weakens the structure of the fruit so that it readily disintegrates within the can.

We have found that by employing a novel apparatus, canned materials may be heated to the temperatures required for preservation in a very short time, and may be cooled down to a moderate temperature after sterilization or other heat treatment in an equally short interval. We have further discovered that as a result of thus reducing the period during which the canned material is maintained at an elevated temperature, the original flavor and color of the material is retained to a remarkable degree, and the natural texture, consistency and structure of solid or semi-solid materials is not undesirably altered.

Our invention permits packing the material in a container, preferably of circular cross section, and turning the container about its axis while circulating a heating or cooling fluid over its outer surface. The circular container may be oscillated about its axis but we generally prefer a rotary motion with the axis of rotation substantially horizontal. In most cases, it is preferred to pack the material in the containers in such a manner that the axial turning produces a rapid circulation of the material, or at least the liquid portion thereof, within the container. In this manner, heat is rapidly conducted between the mass of the material comprising the container contents and the container walls over which the heating or cooling fluid is circulated and the entire mass of the canned material is rapidly heated to or cooled from the temperature required for preservation.

The containers employed may be of any form having a substantially circular section, including cylindrical, conical, tapered and other shapes having an axis of rotation. The containers customarily used are cylindrical metallic cans but containers of glass, fibre or other materials may also be used. We have found that the rapid circulation of the container contents can in most cases be promoted by disposing the center of gravity of the material eccentrically with respect to the axis of rotation of the container. This we prefer to accomplish by leaving a small empty space in each container and oscillating or rotating the container with its axis substantially horizontal. This treatment promotes the rapid circulation of at least the liquid portions of the container contents relative to the container walls, and thereby produces a rapid transfer of heat between the material and the fluid passing in heat exchanging relation with the container.

In accordance with one aspect of our invention, the packed and closed containers are rotated about their horizontal axes while being conducted successively through zones of heating and cooling fluids, preferably in the form of water sprays. Where a prolonged heating is desired, the rotation of the container may be discontinued after the contents thereof have been raised to the desired high temperature, whereby unnecessary agitation of the contents is prevented, and at the conclusion of the heat treatment, rotation may be again initiated while the cooling fluid is applied.

We have found that in addition to preserving the original flavor, color and texture of materials, our invention reduces loss by shrinkage in solid or semi-solid foodstuffs to a remarkable degree. Thus, for example, cellular materials, such as the meats of citrus fruits, which suffer a marked reduction in drained weight during known preserving processes, may be preserved without substantial shrinkage loss when subjected to our improved process.

The apparatus of the present invention comprises generally a series of cylindrical drums which are moved continuously with their axes horizontal and in spaced parallel relation through zones of heating and cooling fluid, preferably in spray form. During this movement, the drums are controllably rotated about their axes. The circular section containers under treatment rest respectively on the cylindrical surfaces of two adjacent drums and are thus rotated by the drums as they are carried through the heating and cooling zones. The apparatus of the invention includes improved mechanism for conveying and rotating the drums and for initiating, terminating and variably controlling the rate of rotation thereof. Other features of the apparatus will be pointed out or will become apparent as the description thereof progresses.

In describing the invention in detail, reference will be made to the accompanying drawings in which:

Figure 1 is an elevation of apparatus embodying the invention, certain portions being omitted to reduce the length thereof;

Figure 2 is a plan view of the apparatus shown in Figure 1;

Figure 3 is an elevation, on a reduced scale, taken at the level indicated by the line 3—3 of Figure 1 and showing the pipe connections between the sectional water tanks of the apparatus housing;

Figure 4 is an elevation of the two end portions of the apparatus, the housing wall being broken away to show the interior construction;

Figure 5 is a sectional view, taken along the line 5—5 of Figure 4 and viewed in the direction of the arrows; and Figure 6 is an elevation of a modified form of the apparatus embodying means for discontinuing the rotation of the containers under treatment in a certain portion of the apparatus.

The embodiment of our invention illustrated in the drawings comprises generally a long continuous housing H with means therein for simultaneously propelling and rotating horizontally disposed containers of circular section, and for spraying water or other fluids of different temperatures over the propelled and rotated containers at different zones or sections of the machine. The housing H may be built in various ways and as shown comprises a series of endwise connected sections S1, S2, S3, etc., each comprising a lower tank or sump portion T having end walls 8, and an upper open-ended portion 9 through which the container conveying and propelling mechanism extends. As shown in Figures 1, 2 and 4, the first or inlet section S1 has a shelf-like extension carrying a container chute 10 which delivers the cans 11 or other containers through an opening 12 and on to the conveying and turning means within the housing H. A flap or door 13 is preferably provided at the housing opening 12 as shown in Figure 4.

The can conveying and turning means disclosed comprises generally a series of spaced parallel drums 14 rotatably carried by a pair of endless flexible chains 15 which extend from end to end of the housing H above the tank or sump portions T of the housing sections S1, S2, etc. The conveying chains 15 pass respectively over each of a pair of sprockets 16 fixed to a cross shaft 17 carried in journals 18 at the inlet end of the housing H, and over a similar pair of sprockets 19 carried by a cross shaft 20 near the exit end of the machine. The journals 18 are preferably adjustable endwise of the housing, and a screw adjustment mechanism 21 has been shown for this purpose.

As best shown in Figure 5, each drum is fixed to a cross shaft 22 and a roller 23 surrounds and is rotatably fixed to the shaft 22 adjacent each end thereof, anti-friction bearings being preferably provided at this point. The rollers 23 ride in channel tracks 24 and 25 which extend respectively along the upper and lower spans of the chains 15 and are carried by suitable brackets 26 and 27. In this manner, the weight of the drums 14 is carried by the tracks 24 and 25 through the rollers 23, and the drums 14 are free to rotate about their respective axes in the bearings of the rollers 23, and are also free to travel along the housing H.

Each drum shaft 22 is connected to the two conveyor chains 15 by suitable means, and as shown, a pin 58 is fixed to each end of the shaft 22 and is journaled in spaced lugs 59 fixed to a link of the adjacent chain 15. In this manner, the spans of the chains 15 are supported through the pins 58 and the shafts 22 by the tracks 24 and 25.

Guide bars 36 carried by brackets 37 are disposed on opposite sides of the drums 14 along their upper span and act to hold the cans 11 against endwise movement. The bars 36 bend downward at the exit end of the machine to guide the cans 11 on to an exit chute 46 passing through an opening 47 in the end of the housing as shown in Figure 4.

The drums 14 may be rotated by various means, and as shown, a driving chain 28 engaging sprockets 29 fixed to each of the drum shafts 22 is employed for this purpose. The chain 28 is carried by sprockets 30 and 31 journaled on suitable cross shafts disposed adjacent the ends of the housing H and within the conveyor chain sprockets 16 and 19, as shown in Figure 4. The sprocket 31 may be adjustable longitudinally of the housing H by suitable means as indicated at 35. The drum propelling chain 28 engages the drum shaft sprockets 29 along the upper span of the chain only and is supported along this span by a channel track 32 and idler sprockets 33. Idler sprockets 34 are preferably provided to support the lower span of the chain 28.

The conveyor chains 15 and drum propelling chain 28 are preferably driven by means which are separately adjustable. As shown, a motor 38 is connected through a suitable speed-changing mechanism 39 of known construction, a chain 40 and a worm drive 41 to the shaft 20 of the sprockets 19 carrying the chains 15. Similarly, a motor 42 is connected to drive the drum propelling chain 28 through a speed-changing mechanism 43, a chain 44 and a worm drive 45 to the shaft of the sprocket 30 carrying the chain 28. Either the mechanism 43 or the motor 42 is preferably reversible so that the direction of movement of the chain 28 may be changed.

With the arrangement described, the cans 11 enter the housing H through the opening 12, and each can rests between two adjacent drums 14. Two or more cans may be nested between each pair of adjacent drums if the size of the can permits this arrangement. The drums move horizontally in the direction indicated by the arrows and carry the cans through the housing H. At the same time, the chain 28 is moved in a direction opposite to that of the drums 14 and thus rapidly rotates the drums in a clockwise direction as viewed in Figure 4, causing the cans to rotate counter-clockwise as they are conveyed through the machines. The speed of the rotation of the cans 11 may be varied by varying the speed of the propelling chain 28 and by reversing the direction of movement of this chain and driving it at the same speed as the chains 15, the cans may be conveyed without rotation. Obviously, the rotary speed of the cans depends upon the relative speed and direction of movement of the chains 15 and 28, and accordingly may be controlled by adjustment of the variable speed drive of either or both of these chains. As shown in Figure 4, the drum propelling chain 28 is carried downwardly away from the drum sprockets 29 as the drums approach the exit end of the machine, and from this point until the drums again reach the upper span of the conveyor chain 15 adjacent the inlet end of the housing H, the rotation of the drums is discontinued. This arrangement prevents the needless expenditure of power to drive drums which are not carrying cans.

In accordance with the invention, fluids having a temperature different from the canned material are brought into heat exchanging relation with the rotating traveling cans 11 within the housing H. This is preferably accomplished by spraying heated or cool water over the cans, and in the disclosed apparatus, suitable means are employed which provide separate zones of hot and cold water sprays through which the cans under treatment are successively conveyed. The invention may involve either heating or cooling alone or a succession of one or more heating or cooling stages. Accordingly, the disclosed apparatus is designed to provide hot or cold sprays at any desired zone or section of the housing. In one embodiment of the invention, the canned material is successively heated to the temperature required for preservation and cooled to a value near room temperature, and the spray apparatus will be first described as adjusted for this operation.

Suitably supported just beneath the upper wall of the housing H are a series of sectional spray headers 48, 49, 50 and 51 which extend longitudinally of the housing adjacent the center thereof and shown in Figures 2, 4 and 6. Each of these headers carries a plurality of spaced depending spray nozzles 52, and a spray liquid, usually water, is supplied to each header through a vertical pipe 53 passing through the upper housing wall. The pipe 53 of each spray header is respectively connected through transverse valve controlled pipes 54 and 55 to both a hot water supply pipe 56 and a cold water supply pipe 57, the hot and cold water pipes extending along the top of the housing H near opposite sides thereof, as shown in Figure 2. With this arrangement, it will be apparent that the sprays 52 of any header section may be supplied at will with either hot water, cold water or a mixture of both. The cold water may be supplied from a refrigerated or natural source as desired and the supply pipe has been indicated at 60. The hot water is preferably recirculated, and may be heated in any suitable manner. As shown, the water from the tanks or sumps T in the hot spray zone is delivered by a motor driven pump 61 through a heat exchanger 62 and pipe 63 to the hot water supply pipe 56. Steam is admitted to the heat exchanger 62 through a pipe 64 and is discharged therefrom through a trap 65 and a pipe 66. If desired, the temperature to which the spray water is heated may be automatically controlled by a thermostat 67 responsive to the water temperature in the pipe 57 and governing the steam inlet valve 68 of the heat exchanger 62.

The water tanks T of the various sections S2 to S7 of the machine are interconnected by the pipes 69, 70, 71, 72 and 73, as shown in Figure 3. It is generally preferred to supply cold water to the spray header 48 of the inlet housing section S1 so that dirt and other foreign matter carried by the entering cans may be removed before the recirculated hot water zone is reached. Accordingly, the water sump of the section S1 is provided with a drain pipe 74. The end or exit sections are customarily supplied with cooling spray water, and a drain pipe 75 has been shown connected to the sump of the last housing section S7 to permit the escape of this water. In a typical arrangement of the apparatus, the spray headers 49 and 50 of the sections S2, S3 and S4 may be supplied with hot water from the pipe 56, and in order that this water may be recirculated from the various sections, the valve of the connecting pipe 69 between the sections S2 and S3 is opened. The spray headers 51 of the last sections S5, S6 and S7 may be supplied with cold water from the pipe 57, and the valve of the connecting pipe 71 is closed and that of connecting pipe 73 opened so that the waste water from the cold zones will flow from section S7 and out of the drain pipe 75.

The operation of the described apparatus will now be explained. The cans 11 or the other containers are packed with the desired foodstuff, beverage or other material and are closed and sealed. In filling the cans, we prefer in most cases to leave a small empty space which is preferably evacuated. This results in disposing the center of gravity of the container contents eccentric with respect to the axis of rotation of the can when in the horizontal position, and promotes the rapid circulation of the container contents, or at least the liquid portion thereof, when the container is rotated. The partial filling of the cans 11 is indicated by the dotted lines thereon in Figures 4 and 5.

The sealed cans enter the machine through the opening 12 and are conveyed therethrough and simultaneously rotated as previously described. In the housing section S1, the cans are washed with cold water from the spray header 48. Then the cans enter the hot zone comprising the sections S2, S3 and S4, wherein hot water from the sprays flows over the rotating can surfaces. The rapid circulation of the heating fluid over the outside of the cans, together with the similarly rapid flow of the canned material, or at least the liquid portion thereof, inside the cans, results in a very rapid heat transfer which quickly raises the material to the temperature required for preservation or other treatment. After being heated, the cans enter the cold zone of the housing sections S5, S6 and S7 and the cold water spray rapidly reduces the temperature of the canned material to a value near room temperature, the heat transfer being facilitated by the rotation of the cans as before.

The described rapid heating and cooling of the canned material prevents the heat deterioration thereof while permitting high preserving temperatures to be attained. By materially reducing the heating period, the original color, flavor and texture of the material is maintained substantially unimpaired, and substantial loss by shrinkage of semisolid material is avoided.

In canning certain foods and beverages, it is necessary to prolong the period during which a relatively high or low temperature is maintained. Our improved apparatus is readily adapted to carry out this procedure by the modification shown in Figure 6. The apparatus there shown is identical with that described above and shown in the other figures, except that means are provided for disengaging the drum rotating chain 28 from the drum sprockets 29 through a portion of the housing length. As shown in Figure 6, at the entrance end of housing section S3, idler sprockets 80, 81 and 82 carry the propelling chain 28 down out of engagement with the drum sprockets 29, and similar idlers 83, 84 and 85 again lift the chain into engagement with the sprockets 29 at the exit end of the housing section S4. It will be understood that the channel track 32 for the propelling chain 28 is removed between the idlers 80 and 85, and that the span of the chain where the track is removed is supported by the idlers 82 and 83. With the arrangement described, the cans 11 are conveyed without rotation through the sections S3 and S4 of the housing and are thus maintained at an elevated or lowered temperature for an extended interval without agitation. The spray headers 50 in the sections S3 and S4 may be turned off if desired, or sufficient fluid of the desired temperature may be introduced therethrough to maintain the cans in these sections at the fixed temperature required. It will, of course, be understood that the rotation of the conveyed cans may be temporarily discontinued at any desired section of the housing, and that the cans may be conveyed without rotation while at any temperature within the range of the fluids employed.

We may provide baffles or aprons to confine the spray water of different temperatures to the desired housing sections, and baffles of this nature have been shown at 86, 87, 88, and 89 in Figure 6.

It should be understood that the described apparatus is adaptable to a wide variety of operations, and is not in any way limited to such connection arrangements as have been described herein. Thus either hot or cold water or a mixture of both may be supplied to the sprays of all or any of the sections and the rotation of the drums and the cans carried thereby may be interrupted at any desired point or for any desired interval of travel of the conveying means. The speed of rotation of the drums and the conveyed cans may be varied as desired by regulating the relative speed and relative direction of motion of the conveying chains 15 and the propelling chain 28.

Although we prefer to agitate the filled containers by rotation during heating and cooling, other means of agitation such as oscillatory turning movement, may be employed.

We claim:

1. In apparatus for treating perishable food products in closed containers of circular cross-section, means for conveying and agitating such containers, a pair of horizontally aligned substantially parallel spaced conveyor chains, a plurality of container carrying drums extending substantially horizontally transversely of said conveyor chains in parallel spaced relation, shafts fixed axially to each of said drums, means rotatably connecting the respective ends of each of said drum shafts to transversely aligned points on said conveyor chains, track means beyond the container-carrying portions of said drums, said track means extending parallel to said conveyor chains adjacent said drum shafts, circular means rotatably carried by each of said drum shafts and engaging said track means, a propelling chain extending parallel to said conveyor chains adjacent said drum shafts, a sprocket fixed to each of said drum shafts engaging said propelling chain, and means for moving said conveyor chains and said propelling chain longitudinally at separately variable speeds.

2. In an apparatus for treating perishable food products in closed containers of circular cross-section including a housing having an elongated passage therethrough and conveying means movable longitudinally of said passage for conveying containers therethrough; the improvement which comprises a series of container-supporting drums forming part of said conveying means and disposed in parallel spaced relation with their axes substantially horizontal and extending transversely of said passage, means for rotating said drums during their movement through said passage, and means for creating zones of different temperatures in different portions of said elongated passage.

3. In an apparatus for treating perishable food products in closed containers of circular cross-section including a housing having an elongated passage therethrough and conveying means movable longitudinally of said passage for conveying containers therethrough; the improvement which comprises a series of container-supporting drums forming part of said conveying means and disposed in parallel spaced relation with their axes substantially horizontal and extending transversely of said passage, means for rotating said drums during their movement through said passage, means for discontinuing rotation of said drums during a portion of their travel through said passage, and means for creating zones of different temperatures in different portions of said elongated passage.

4. In an apparatus for treating perishable food products in closed containers of circular cross-section including a housing having an elongated passage therethrough and conveying means movable longitudinally of said passage for conveying containers therethrough; the improvement which comprises a series of container-supporting drums forming part of said conveying means and disposed in parallel spaced relation with their axes substantially horizontal and extending transversely of said passage, means for rotating said drums during their movement through said passage, means for varying the speed of rotation of said drums independently of the speed of longitudinal movement of the conveying means, and means for creating zones of different temperatures in different portions of said elongated passage.

5. In an apparatus for treating perishable food products in closed containers of circular cross-section including a housing having an elongated passage therethrough and conveying means movable longitudinally of said passage for conveying containers therethrough; the improvement which comprises a series of container-supporting drums forming part of said conveying means and disposed in parallel spaced relation with their axes substantially horizontal and extending transversely of said passage, means for rotating said drums during their movement through said passage, means for separately varying the speed of longitudinal movement of said conveying means and the speed of rotation of said drums, and means for creating zones of different temperatures in different portions of said elongated passage.

HORACE L. SMITH, Jr.
LUCIAN N. JONES.